United States Patent [19]

Asamizuya et al.

[11] Patent Number: 6,003,071
[45] Date of Patent: Dec. 14, 1999

[54] IMAGE DATA TRANSMISSION APPARATUS USING TIME SLOTS

[75] Inventors: Noboru Asamizuya; Norio Ebihara; Satoshi Yoneya; Yasumasa Kodama; Kenji Mori, all of Kanagawa, Japan

[73] Assignee: Sony Corporation, Tokyo, Japan

[21] Appl. No.: 08/844,309

[22] Filed: Apr. 10, 1997

Related U.S. Application Data

[63] Continuation of application No. 08/375,677, Jan. 20, 1995, abandoned.

[30] Foreign Application Priority Data

Jan. 21, 1994 [JP] Japan .................................. 6-022031
Feb. 21, 1994 [JP] Japan .................................. 6-044713

[51] Int. Cl.[6] .............................................. H04N 7/173
[52] U.S. Cl. .............................. 709/217; 348/7; 348/12
[58] Field of Search .............................. 348/6, 7, 10, 12, 348/13; 345/321; 709/217, 218, 219

[56] References Cited

U.S. PATENT DOCUMENTS

| | | | |
|---|---|---|---|
| 4,654,819 | 3/1987 | Stiffler et al. ........................... | 395/489 |
| 5,007,053 | 4/1991 | Iyer et al. ...................... | 395/182.04 X |
| 5,077,736 | 12/1991 | Dunphy, Jr. et al. .............. | 395/182.05 |
| 5,239,659 | 8/1993 | Rudeseal et al. ....................... | 395/800 |
| 5,371,532 | 12/1994 | Gelman et al. . | |
| 5,473,362 | 12/1995 | Fitzgerald et al. .......................... | 348/7 |
| 5,539,660 | 7/1996 | Blair et al. .................................. | 348/7 |

FOREIGN PATENT DOCUMENTS

WO-A 91 03112  3/1991  WIPO .
WO-A 91 13404  5/1991  WIPO .

OTHER PUBLICATIONS

Communications: Rising to the Heights, Denver, Jun. 23–26, 1991, IEEE, A.D. Gelman et al., "A Store–and–Forward Architecture for Video–On–Demand Service". pp. 842–846.

W.D. Sincoskie, System architecture for a large scale video on demand service, Coputer Networks and ISDN Systems 22, pp. 155–162, 1991.

*Primary Examiner*—Nathan Flynn
*Attorney, Agent, or Firm*—Frommer Lawrence & Haug. LLP.; William S. Frommer

[57] ABSTRACT

The image data transmission apparatus for transmitting image data signal to a plurality of end devices corresponding to the request from each end device, divides the input image data signal into a plurality of unit image data to subsequently store it on the recording medium, controls operation of the plural storing means so that the unit image data for each end device is read out by time division from the recording region in each storing means which is different from each other corresponding to requests from each end device, combines the unit image data for each end device which is read out from each storing means by each end device to form image data signal for each end device, and transmits it to each correspond end device.

13 Claims, 12 Drawing Sheets

IMAGE DATA TRANSMISSION APPARATUS USING TIME SLOTS

This application is a continuation of application Ser. No. 08/375,677, filed Jan. 20, 1995 now abandoned.

BACKGROUND OF THE INVENTION

1. Field of the Invention

This invention relates to an image data transmission apparatus and, for example, is applicable to an image data transmission apparatus which transmits image data requested by a receiver.

2. Description of the Related Art

Conventionally this type of image data transmission apparatus includes CATV (cable television system), captain system which employ a telephone circuit network. CATV unilaterally provides programs to a receiver by using a video tape recorder (VTR) which is generally a sequential access memory apparatus.

CATV provides several receivers with program information reproduced by VTR as described above, so that such CATV have a drawback in that programs desired by receivers cannot be provided at a time when receivers desire. Such programs thereby fail to satisfy the requirements of receivers.

For example, when receivers select a desired program, such a program is unilaterally supplied to a several receivers irrespective of their requirements. Hence receivers feel that they are inconvenienced because they cannot watch a program from the very beginning thereof.

As one of means for solving such a problem, it can be considered to provide program information at the time when receivers desire corresponding to the requirements of receivers by using VTR and video tapes using the same number as the number of receivers. However, such a method involves the problem of a large operation cost together with the increased size of the equipment.

SUMMARY OF THE INVENTION

In view of the foregoing, an object of this invention is to provide an image data transmission apparatus which can provide image data corresponding to the requirements of each receiver with a relatively simple construction.

Another object of the invention is to provide an image data transmission apparatus which can interpolate image data.

The foregoing objects and other objects of the invention have been achieved by the provision of a data transmission apparatus for transmitting image data signal to a plurality of end devices corresponding to requests from the plurality of end devices comprising: dividing means for dividing input image data signal into a plurality of unit image data; plural storing means having each recording medium for subsequently storing the plurality of unit image data divided by the dividing means on the recording medium; control means for controlling operation of the plural storing means so that the unit image data for each end device is read out by time division from the recording region on the each storing means which is different from each other corresponding to requests from the each end device; combining means for combining the unit image data for the each end device which is read out from the each storing means by the each end device, and forming image data signal for the each end device; and transmitting means for transmitting image data signal for each end device which is output from the combining means to each correspond end device.

To achieve another object of this invention, the image data transmission apparatus described above further comprising: detecting means for detecting whether or not there is any fault in the storing means, and data concealment means for generating unit image data to be generated by faulted storing means, from the other unit image data generated by the other storing means by interpolation, and supplying this unit image data generated by interpolation to the combining means.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Image Data Transmission Apparatus (1-1) General construction

Figure 1:
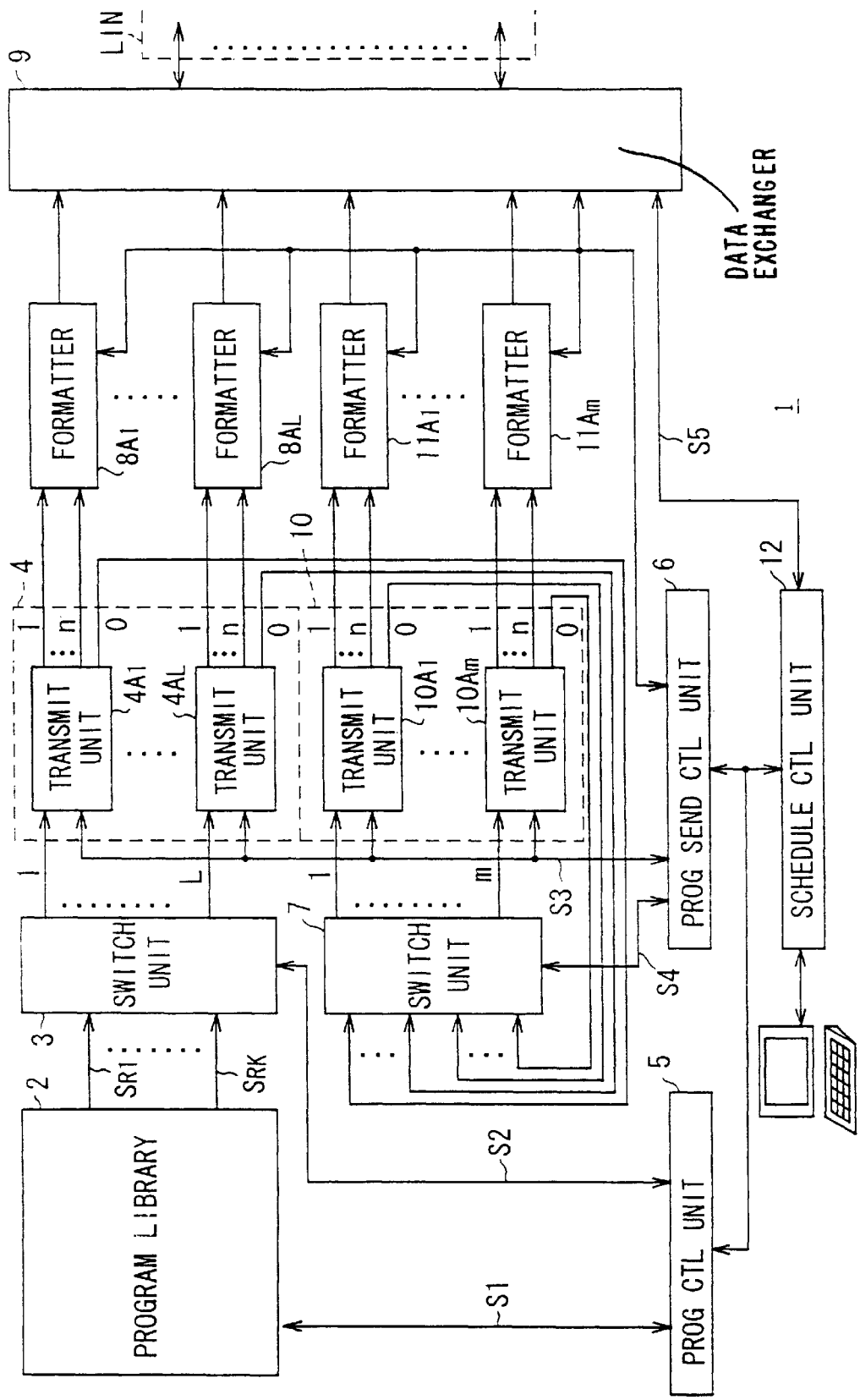
FIG. 1 is a block diagram showing an embodiment of the image data transmission apparatus of this invention.

In FIG. 1, reference numeral 1 generally shows an image data transmission apparatus which is constituted so that desired program information, such as movie program and so on, is provided to each receiver corresponding to the receiving request transmitted from several end devices 30A, 30B, ... 30N on the side of the receivers via a telephone circuit LIN.

The image data transmission apparatus 1 selectively provides program information $S_{R1}$, $S_{R2}$, ... $S_{R(k-1)}$, and $S_{RK}$ obtained from a program library 2 to a plurality of data transmitting units $4A_1$, $4A_2$, ... $4A_{L-1}$, and $4A_L$ which constitute the first group of the data transmitting units 4 via a switching unit 3.

Here, the program library 2 is composed of a cassette auto changer containing a plurality of VTR. By automatically loading a cassette in which desired program is recorded into each VTR and reproducing them based on the control signal S1 from a program control unit 5, different program information $S_{R1}$ to $S_{RK}$ can be output simultaneously from "k" output channels.

The switching unit 3 is composed of (k×L) matrix switching units comprising "k" inputs and "L" outputs so that program information $S_{R1}$ to $S_{RK}$ transmitted from the program library 2 is selectively output to the data transmitting units $4A_1$ to $4A_L$ corresponding to the control signal S2 from the program control unit 5.

Each of the data transmitting units $4A_1$ to $4A_L$ has one input channel and (n+1) output channels. Furthermore, each the data transmitting units $4A_1$ to $4A_L$ has a memory device with a large capacity so that input program information is temporarily stored and read out to output based on the control signal S3 from a program sending control unit 6.

N-th channel out of (n+1) channels in the data transmitting units $4A_1$ to $4A_L$ is allotted for the receivers whereas one remaining output channel is connected to a switching unit 7.

Identification information (ID information) corresponding to receivers is added to the program information output from the data transmitting units $4A_1$ to $4A_L$ for the receivers by formatters $8A_1$ to $8A_L$. Simultaneously, the program information is converted into a format suitable for the input format of a data exchanger 9 and then provided to each receiver via the data exchanger 9 and the telephone circuit LIN. This enables the image data transmission apparatus 1 to provide the program information having same content from, for example, the data transmitting unit $4A_1$ to n-th receivers, and to provide the program information different from the program information in the data transmitting unit $4A_1$, from the data transmitting unit $4A_L$ to n-th receivers.

Furthermore, the image data transmission apparatus 1 has the second group of the data transmitting units 10, which is composed of data transmitting units $10A_1$ to $10A_m$ having the same constitution as the data transmitting units $4A_1$ to $4A_L$.

N output channel out of (n+1) output channels in each of the data transmitting units $10A_1$ to $10A_m$ are allocated for the receivers whereas the remaining one output channel is connected to the switching unit 7. ID information corresponding to the receivers is added to the program information output from the data transmitting units $10A_1$ to $10A_m$ for the receivers by formatters $11A_1$ to $11A_m$. Simultaneously, the program information is converted into a format suitable for the input format of the data exchanger 9 and then provided to each receiver via the data exchanger 9 and the telephone circuit LIN.

The switching unit 7 is composed of a {(L+m)×m} matrix constitution. By switching connection based on the control signal S4 from the program sending control unit 6, the program information output from the first group of the data transmitting units 4 and the second group of the data transmitting units 10 is selectively supplied to the data transmitting units $10A_1$ to $10A_{m-1}$ or $10A_m$ of the second group of the data transmitting units 10.

Figure 2:
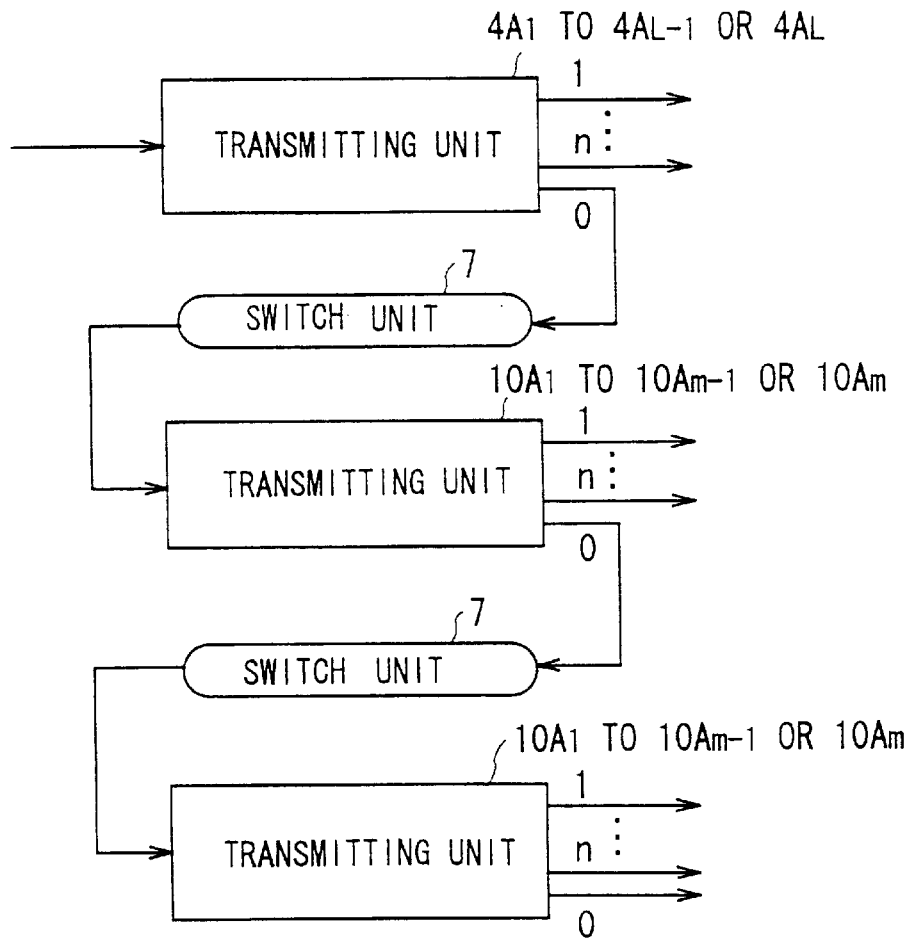
FIG. 2 is a schematic diagram explaining an example of the concatenated connection of data transmitting units of the image data transmission apparatus shown in FIG. 1.

Consequently, as shown in FIG. 2, when many requests (n or more) are made that cannot be satisfied with one of the data transmitting units $4A_1$ to $4A_{L-1}$ or $4A_L$ to the program information of the data transmitting units $4A_1$ to $4A_{L-1}$ or $4A_L$ in the first group of the data transmitting units 4, the program information from the data transmitting units $4A_1$ to $4A_{L-1}$ or $4A_L$ is provided once via empty data transmitting units $10A_1$ to $10A_{m-1}$, or $10A_m$ in the second group of the data transmitting units 10, so that the image data transmission apparatus 1 can double the number of receivers (2n receivers) whom the program information can be provided.

Furthermore, when many requests (2n or more) are made which cannot be satisfied with two transmitting units, namely the data transmitting units $4A_1$ to $4A_{L-1}$ or $4A_L$ and one data transmitting unit of the second group of the data transmitting units $10A_1$ to $10A_{m-1}$ or $10A_m$, the number of output channels of the program information is increased by concatenated connecting different data transmitting units $10A_1$ to $10A_{m-1}$ or $10A_m$ to the succeeding stage of the data transmitting units $10A_1$ to $10A_{m-1}$ or $10A_m$ in the second group of the data transmitting units 10.

Thus, the image data transmission apparatus 1 is constituted so that the number of receivers that can receive program information at the same time effectively using the data transmitting units, by increasing the number of data transmitting units $10A_1$ to $10A_{m-1}$ or $10A_m$ that are concatenatedly connected along with an increase in the number of requests for a certain program information item.

Figure 3:
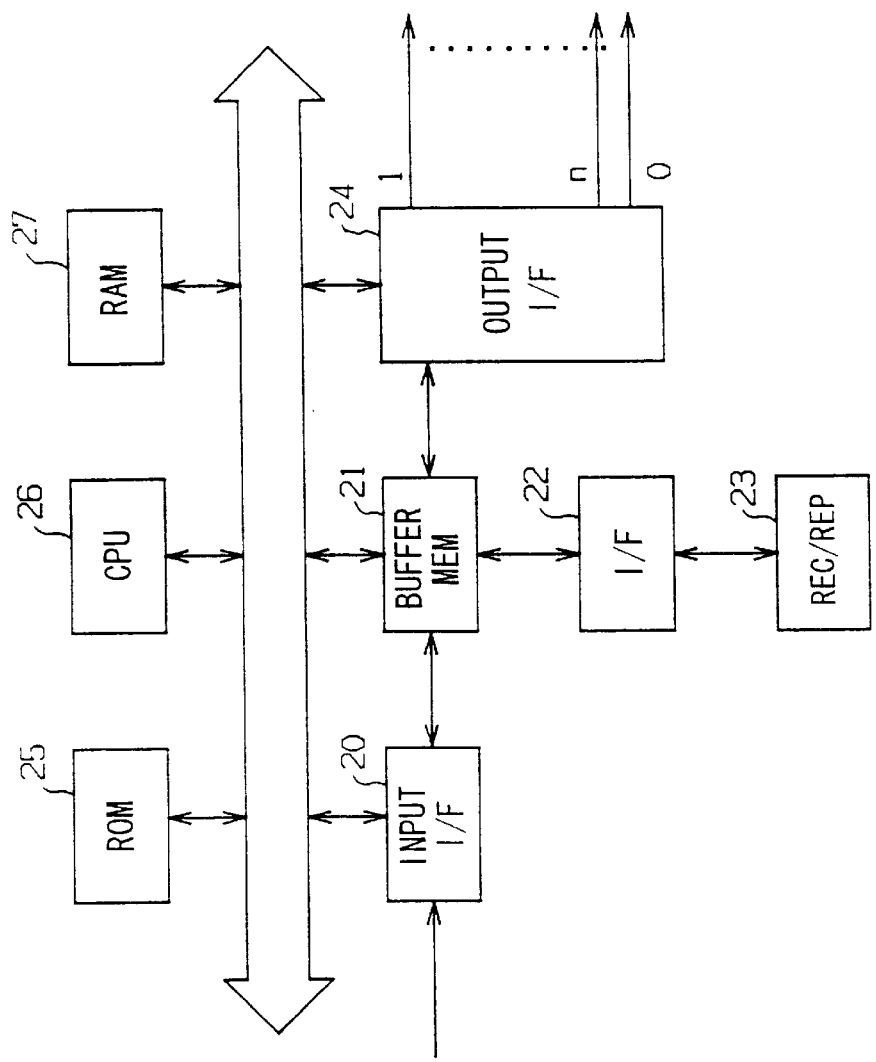
FIG. 3 is a block diagram showing an embodiment of construction of the data transmitting unit of the image data transmission apparatus shown in FIG. 1.

Here, each of the data transmitting units $4A_1$ to $4A_L$ in the first group of the data transmitting units 4 and each of the data transmitting units $10A_1$ to $10A_m$ in the second group of the data transmitting units 10 are constituted as shown in FIG. 3.

The data transmitting units $4A_1$ to $4A_L$ and $10A_1$ to $10A_m$ input the program information from the switching units 3 or 7 to a buffer memory 21 via an input interface 20.

The data transmitting units $4A_1$ to $4A_L$ and $10A_1$ to $10A_m$ can record the output of buffer memory 21 on a predetermined recording medium by a recording and reproducing unit 23 via a recording and reproducing interface 22, and at the same time can output the program information from a plurality of output channels via an output interface 24.

In the case of this embodiment, a magneto-optical disc that can record the program information in the amount, for example, corresponding to one movie film as a recording medium is used. As the recording and reproducing unit 23, a disc recording and reproducing device is used that can record the program information on this magneto-optical disc and at the same time can reproduce the program information at a high speed. Consequently, the recording and reproducing unit 23 can access desired recording area of the recording medium to reproduce the desired information at a high speed corresponding to the request from the receivers.

The program information read out from the recording and reproducing unit 23 is extended in the direction of the time axis with buffer memory 21 and lowered to the predetermined transmission rate, and then is sent to a plurality of receivers (n or less) via the output interface 24.

For reference, write-in operation and read-out operation of the program information by the recording and reproducing unit 23 are controlled by a CPU 26 by using ROM 25 and RAM 27.

Figure 4:
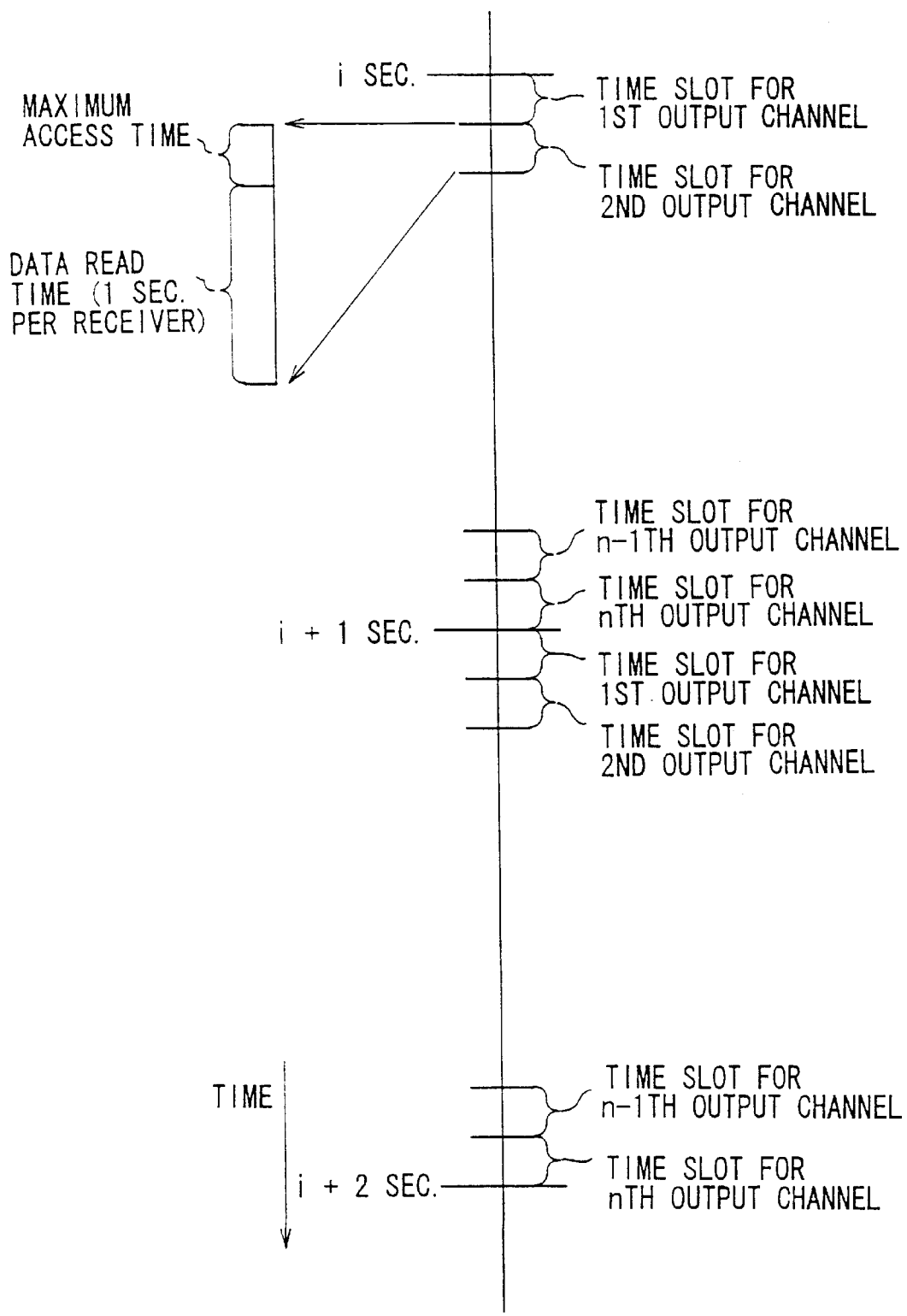
FIG. 4 is a timing chart explaining operation of the data transmitting unit of the image data transmission apparatus shown in FIG. 1.

As shown in FIG. 4, when the program information has been already recorded on the recording medium, the recording and reproducing unit 23 divides unit time (1 second in the case of this embodiment) into n-th time slots to distribute each of the time slots to each receiver, and then accesses to different position of the recording medium for each of the time slots and reads out recorded data in this position at a high speed. Therefore, the same program information can be provided having a time lag to a plurality of receivers.

Consequently, the image data transmission apparatus 1 can provide the program information to each of the receivers from the head.

In other words, the recording and reproducing unit 23 accesses to a predetermined area of the recording medium at a high speed at T/n [sec] assuming unit time as T [sec], and simultaneously reproduces data of amount of T [sec] for one receiver at a high speed.

Furthermore, the recording and reproducing unit 23 is constituted so that the program information having a time lag can be sent to each of the receivers while recording the program information from the program library 2 on the recording medium or from different data transmitting units $4A_1$ to $4A_L$ and $10A_1$ to $10A_m$.

Figure 5:
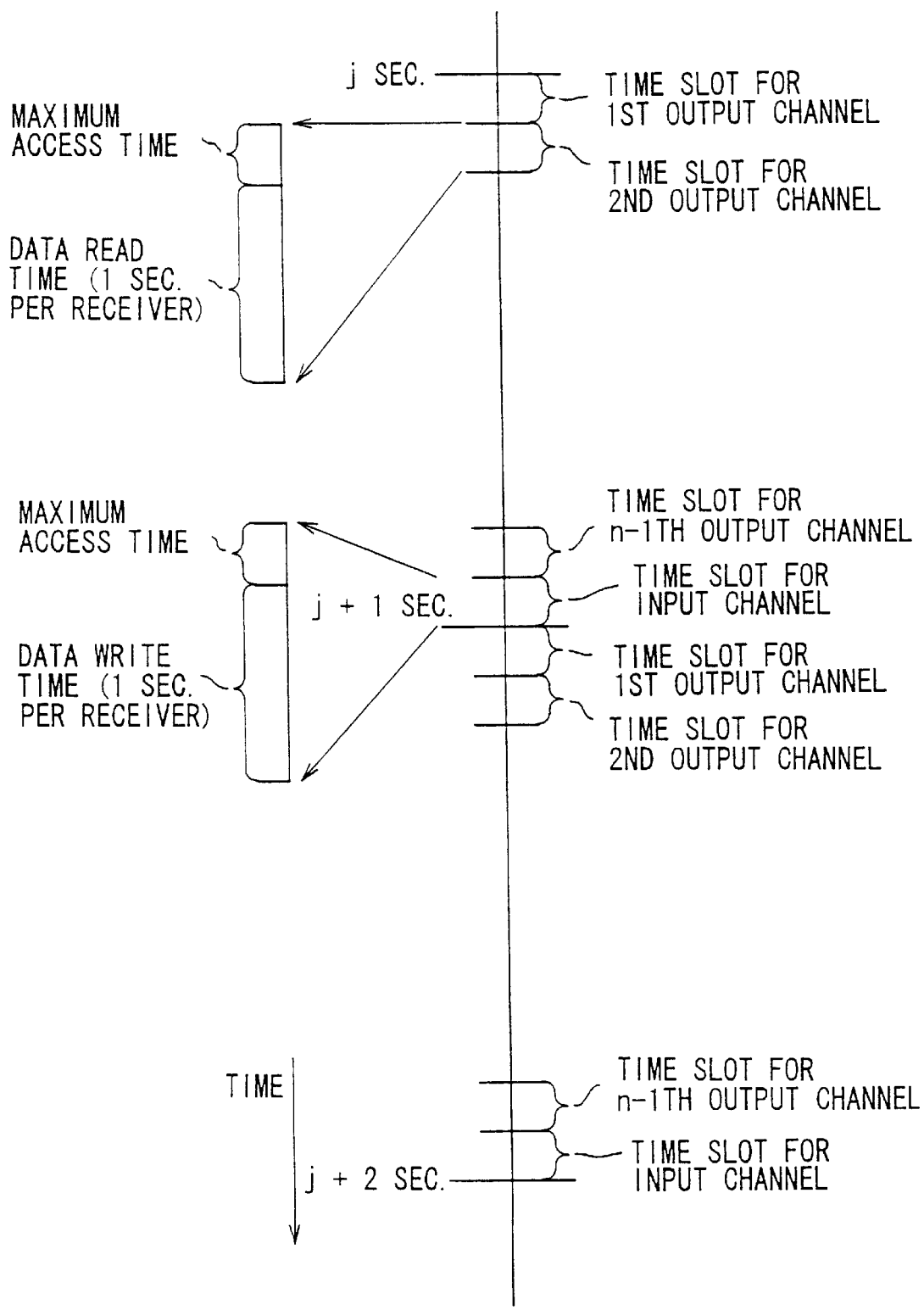
FIG. 5 is a timing chart explaining operation of the image data transmission apparatus shown in FIG. 1.

In this case, as shown in FIG. 5, the recording and reproducing unit 23 divides unit time into n-th time slots to read out recorded data with (n−1) time slots and, at the same time, records the program information from the program library 2 or different data transmitting units $4A_1$ to $4A_L$ and $10A_1$ to $10A_m$ with the remaining one time slot.

Here, when the unit time is T [sec], the maximum access time to the recording medium of the recording and reproducing unit 23 is $t_a$ [sec], data write-in and read-out rate of the recording and reproducing unit is "r" [byte/sec], and the amount of data transmitted to the receivers within unit time T is "d" [byte], the number of time slots "S" of each of the data transmitting units $4A_1$ to $4A_L$ or $10A_1$ to $10A_m$ can be set as the following equation:

$$S = \frac{T}{t_a + \frac{d}{r}} \quad (1)$$

In addition, the image data transmission apparatus 1 starts copying of data from the preceding stage of the data transmitting units to the succeeding stage of the data transmitting units when sending transmission data to many receivers via a plurality of data transmitting units $4A_1$ to $4A_L$ and $10_{A1}$ to $10_{Am}$ by concatenated connecting the data transmitting units $4A_1$ to $4A_L$ and $10A_1$ to $10A_m$ upon requests made to the n-th receiver to the front column data transmitting unit.

This enables the image data transmission apparatus 1 to instantly provide data corresponding to the request from the back column to this receiver by allotting this receiver to the back column upon receiving request of (n+1)-th receiver to the data in the front column data transmitting unit.

(1-2) Processing of the schedule control unit

Figure 6:
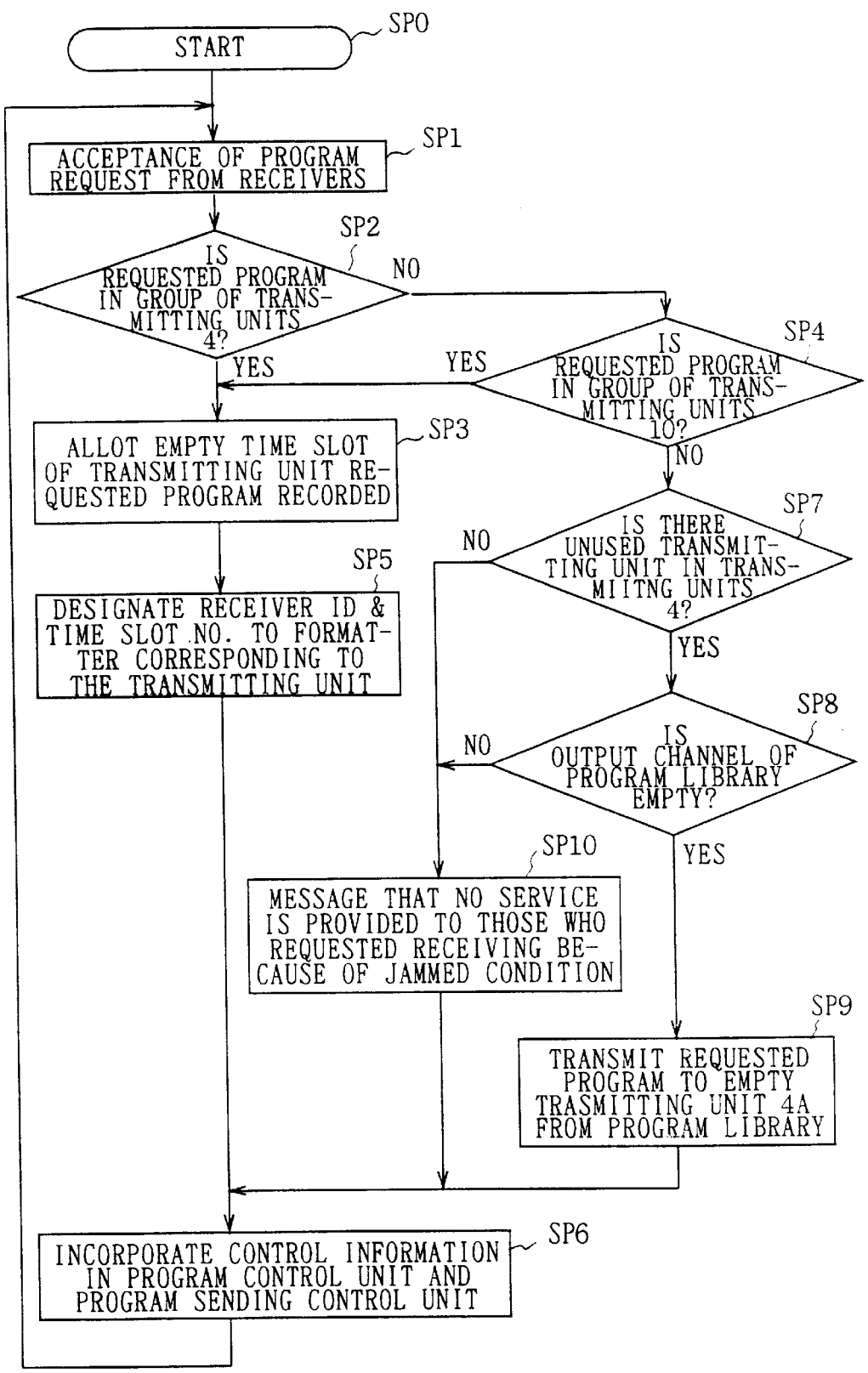
FIG. 6 is a flowchart explaining an example of operation of the schedule control unit of the image data transmission apparatus shown in FIG. 1.

Here, a schedule control unit 12 of the image data transmission apparatus 1 totally controls the image data transmission apparatus 1 by executing the processing procedure shown in FIG. 6.

In other words, the schedule control unit 12 enters the processing from step SP0 and inputs receiving signal S5 from the data exchanger 9 which designates a program request from the receivers at step SP1, and then proceeds to step SP2 to determine whether or not the program requested at step SP1 is present in either of the data transmitting units $4A_1$ to $4A_{L-1}$ or $4A_L$ of the first group of the data transmitting units 4.

If an affirmative result is obtained at step SP2, the schedule control unit 12 proceeds to step SP3. On the other hand, if a negative result is obtained at step SP2, the schedule control unit 12 proceeds to step SP4 to determine whether or not the program requested at step SP1 is present in either of the data transmitting units $10A_1$ to $10A_{m-1}$ or $10A_m$ of the second group of the data transmitting units 10, and, if an affirmative result is obtained, it proceeds to step SP3.

At step SP3, the schedule control unit 12 allots empty time slot in the data transmitting units $4A_1$ to $4A_L$ or $10_{A1}$ to $10A_m$ in which requested programs are recorded.

At next step SP5, the schedule control unit 12 designates the receiver ID and the time slot number to the formatters $8A_1$ to $8A_L$ or $11A_1$ to $11A_m$ corresponding to the data transmitting units $4A_1$ to $4A_L$ or $10A_1$ to $10A_m$ in which time slots are allotted at step SP3, and then proceeds to step SP6.

On the contrary, if a negative result is obtained at step SP4, the schedule control unit 12 proceeds to step SP7 to determine whether or not there are the data transmitting units $4A_1$ to $4A_{L-1}$ or $4A_L$ in the first group of the data transmitting units 4 that are not used. If an affirmative result is obtained, the schedule control unit 12 proceeds to step SP8 to determine whether or not the output channel of the program library 2 is empty. If an affirmative result is obtained at step SP8, the schedule control unit 12 proceeds to step SP9 to transmit a requested program from the program library 2 to empty data transmitting units $4A_1$ to $4A_{L-1}$ or $4A_L$ in the first group of the data transmitting units 4, and then the proceeds to step SP6.

If a negative result is obtained at steps SP7 and SP8, the schedule control unit 12 proceeds to step SP10 to send out a message indicating that service cannot be provided because of jammed conditions to those who request receiving via the data exchanger 9, and then proceeds to step SP6.

When taking the control information obtained from the program control unit 5 and the program sending control unit 6 in at step SP6, the schedule control unit 12 returns to step SP1 to repeat the aforementioned processing.

(1-3) Processing of the program control unit

Figure 7:
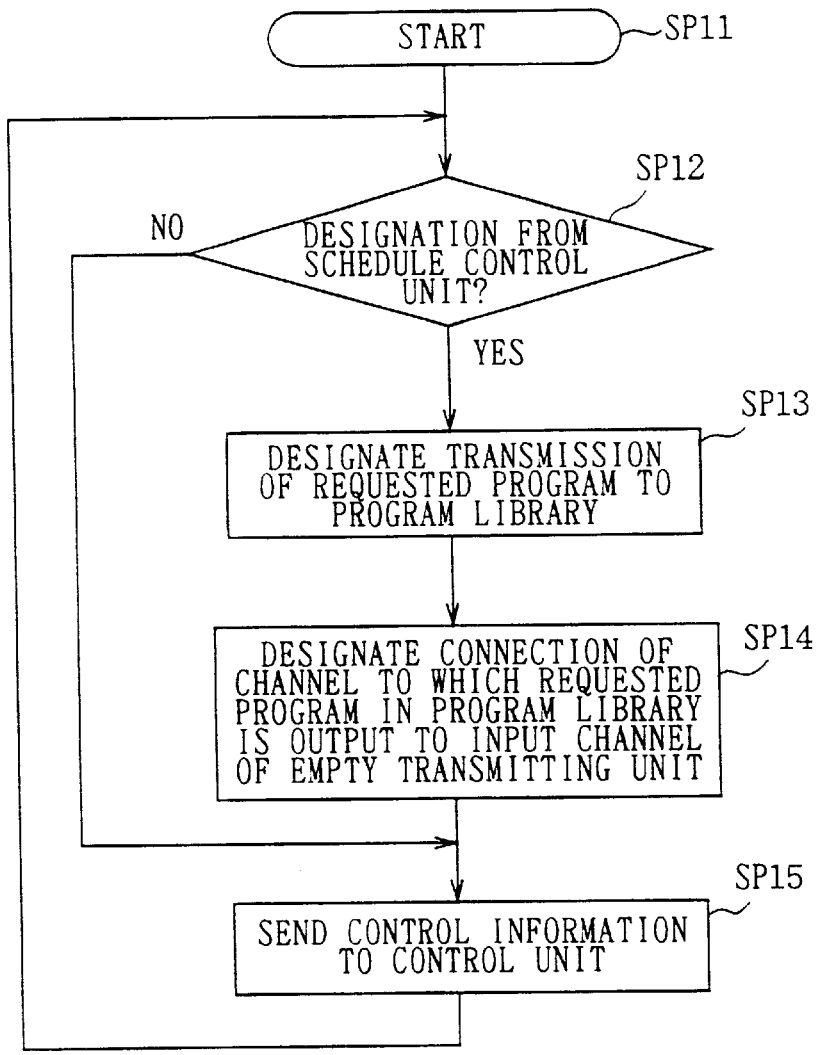
FIG. 7 is a flowchart explaining an example of operation of the program control unit of the image data transmission apparatus shown in FIG. 1.

The program control unit 5 executes the processing procedure as shown in FIG. 7 based on the control signal from the schedule control unit 12, thereby selectively transmits the program information to the data transmitting units $4A_1$ to $4A_L$ of the first group of the data transmitting units 4 by controlling the program library 2 and the switching unit 3.

That is, the program control unit 5 starts processing from step SP11, and, at step SP12, determines whether or not the schedule control unit 12 designated. If an affirmative result is obtained, the program control unit 5 proceeds to step SP13 to send out the control signal S1 designating the requested program is transmitted to the program library 2.

Next, the program control unit 5 proceeds to step SP14 to designate the connection of the input channel of empty data transmitting units $4A_1$ to $4A_{L-1}$ or $4A_L$ and the output channel of the program library 2 for outputting the request program to the switching unit 3, and then proceeds to step SP15.

On the other hand, if a negative result is obtained at step SP12, the program control unit 5 proceeds to step SP15. At step SP15, the program control unit 5 sends out the control information of the program library 2 and the switching unit 3 to the schedule control unit 12, and then returns to step SP12 to repeat the aforementioned processing.

(1-4) Processing of the program sending control unit

Figure 8:
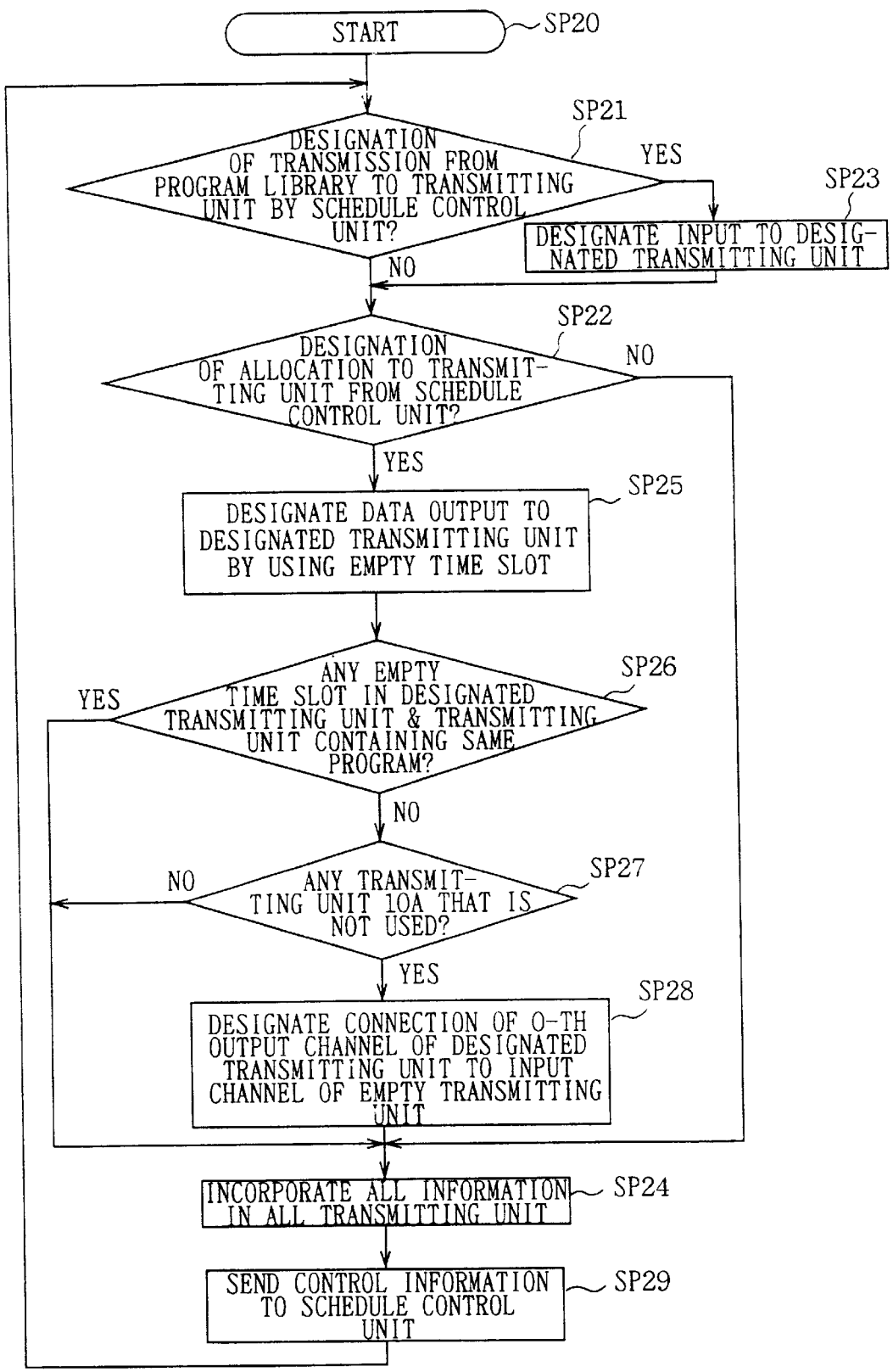
FIG. 8 is a flowchart explaining an example of operation of the program sending control unit of the image data transmission apparatus shown in FIG. 1.

The program sending control unit 6 controls the switching unit 7 and the data transmitting units $4A_1$ to $4A_L$ and $10A_1$ to $10A_m$ by executing the processing procedure shown in FIG. 8 based on the control signal from the schedule control unit 12.

That is, the program sending control unit 6 starts processing from step SP20 and, at step SP21, determines whether or not the schedule control unit 12 designates to send out the program information of the program library 2 from the schedule control unit 12 to the data transmitting units $4A_1$ to $4A_{L-1}$ or $4A_L$. If a negative result is obtained, the program sending control unit 6 proceeds to step SP22. On the other hand, if an affirmative result is obtained at step SP21, the program sending unit 6 gives a designation to input the program information from the program library 2 to designated data transmitting units $4A_1$ to $4A_{L-1}$ or $4A_L$ at step SP23, and then proceeds to step SP22.

At step SP22, the program sending control unit 6 determines whether or not the schedule control unit 12 designates to allot the receiver to the data transmitting units $4A_1$ to $4A_L$ and $10A_1$ to $10A_m$, and, if a negative result is obtained, proceeds to step SP24 to capture information in all data transmitting units $4A_1$ to $4A_L$ and $10A_1$ to $10A_m$.

On the other hand, if an affirmative result is obtained at step SP22, the program sending control unit 6 proceeds to step SP25 to designate the output of data by using the empty time slot to designated data transmitting units $4A_1$ to $4A_L$ and $10A_1$ to $10A_m$.

The program sending control unit 6 determines at subsequent step SP26 whether or not an empty time slot is present in the data transmitting units $4A_1$ to $4A_L$ and $10A_1$ to $10A_m$ designated at step SP25 or the data transmitting units $4A_1$ to $4A_L$ and $10A_1$ to $10A_m$ in which the same program is input. If an affirmative result is obtained, the program sending control unit 6 proceeds to step SP24. On the other hand, if a negative result is obtained at step SP26, the program sending control unit 6 proceeds to step SP27.

At step SP27, the program sending control unit 6 determines whether or not there are the data transmitting units $4A_1$ to $4A_{L-1}$ or $4A_L$ that are not used, and, if a negative result is obtained, proceeds to step SP14. On the other hand, if an affirmative result is obtained, the program sending control unit 6 proceeds to step SP28.

At step SP28, the program sending control unit 6 send out the control signal S4 to the switching unit 7 in order to designate the connection of the 0th output channel of designated data transmitting units $4A_1$ to $4A_L$ or $10A_1$ to $10A_m$ to the input channel of empty data transmitting units $10A_1$ to $10A_m$. In this manner, at steps SP25 to SP28, when the output channel of the data transmitting units $4A_1$ to $4A_L$ or $10A_1$ to $10A_m$ cannot satisfy the receiving requests, the program sending unit 6 concatenatedly connects the data transmitting units $10A_1$ to $10A_m$ to the back column of the data transmitting units $4A_1$ to $4A_L$ or $10A_1$ to $10A_m$. Therefore, the number of output channels are increased.

The program sending control unit 6 takes in information in all data transmitting units $4A_1$ to $4A_L$ and $10A_1$ to $10A_m$ at subsequent step SP24, and proceeds to step SP29 to sent out information captured at step SP24 to the schedule control unit 12 as the control information, and then returns to step SP21 to repeat the aforementioned processing.

(1-5) Operation of the image data transmission apparatus

In the aforementioned construction, when a program request is made from the first receiver, the image data transmission apparatus 1 determines at the outset whether or not this program is present in the data transmitting units $4A_1$ to $4A_L$ or $10A_1$ to $10A_m$. When a program request is made to either of the data transmitting units $4A_1$ to $4A_L$ or $10A_1$ to $10A_m$, the image data transmission apparatus 1 allots the receiver to the empty time slot of the transmitting units $4A_1$ to $4A_L$ or $10A_1$ to $10A_m$.

On the other hand, if there is no requested program in any of the data transmitting units $4A_1$ to $4A_L$ or $10A_1$ to $10A_m$, the requested program is sent to the first receiver from the data transmitting units $4A_1$ to $4A_L$ or $10A_1$ to $10A_m$, transmitting and copying the requested program to empty data transmitting units $4A_1$ to $4A_L$ or $10A_1$ to $10A_m$ from the program library 2.

Furthermore, when the second receiver requests the program same as the first receiver with a time lag with the first receiver, the image data transmission apparatus 1 allots the second receiver to a different time slot of the data transmitting units $4A_1$ to $4A_L$ or $10A_1$ to $10A_m$ to which the first receiver is allotted.

At this time, the image data transmission apparatus 1 accesses to the recorded point corresponding to the time when a program is requested at a high speed for each of the time slots to read out recorded data at a high speed.

Consequently, the data transmission apparatus 1 can provide a plurality of receivers with the program information having a time lag corresponding to the request time.

Furthermore, when a program request is made which cannot be satisfied with one of the data transmitting units $4A_1$ to $4A_L$ or $10A_1$ to $10A_m$, namely when a program request is made which exceeds the number of time slots allotted within unit time T of the data transmitting units $4A_1$ to $4A_L$ or $10A_1$ to $10A_m$, the image data transmission apparatus 1 transmits the program information in the data transmitting units $4A_1$ to $4A_L$ or $10A_1$ to $10A_m$ to different data transmitting units $10A_1$ to $10A_{m-1}$ or $10A_m$ in the second group of the data transmitting units 10 to provide the receivers with the program information via the data transmitting units $10A_1$ to $10A_{m-1}$ or $10A_m$.

Consequently, when a program request is made which exceeds the capacity of one of the data transmitting units $4A_1$ to $4A_L$ or $10A_1$ to $10A_m$, the image data transmission apparatus 1 can provide many receivers with the same program information with a time lag by effectively using different data transmitting units $10A_1$ to $10A_{m-1}$ and $10A_m$, thereby enabling the elimination on the limit on the number of receivers that can receive programs.

In the construction described above, the program information is once recorded in the data transmitting units $4A_1$ to $4A_L$ or $10A_1$ to $10A_m$, and requests from the receivers are distributed to each of a plurality of time slots to access to the different recording area of the recording medium at a high speed and to read out at a high speed. Therefore, the image data transmission apparatus 1 can be realized that can provide each receiver with program information corresponding to a time lag although programs having a time lag are requested by each receiver.

Furthermore, when many program requests are made which cannot be satisfied with one of the data transmitting units $4A_1$ to $4A_L$ or $10A_1$ to $10A_m$, the data transmitting units $4A_1$ to $4A_L$ and $10A_1$ to $10A_m$ can be effectively used by concatenatedly connecting the data transmitting units $10A_1$ to $10A_m$ corresponding to the number of program requests, so that the image data transmission apparatus 1 can be realized with a simplified construction.

(1-6) Another embodiment

Figure 9:
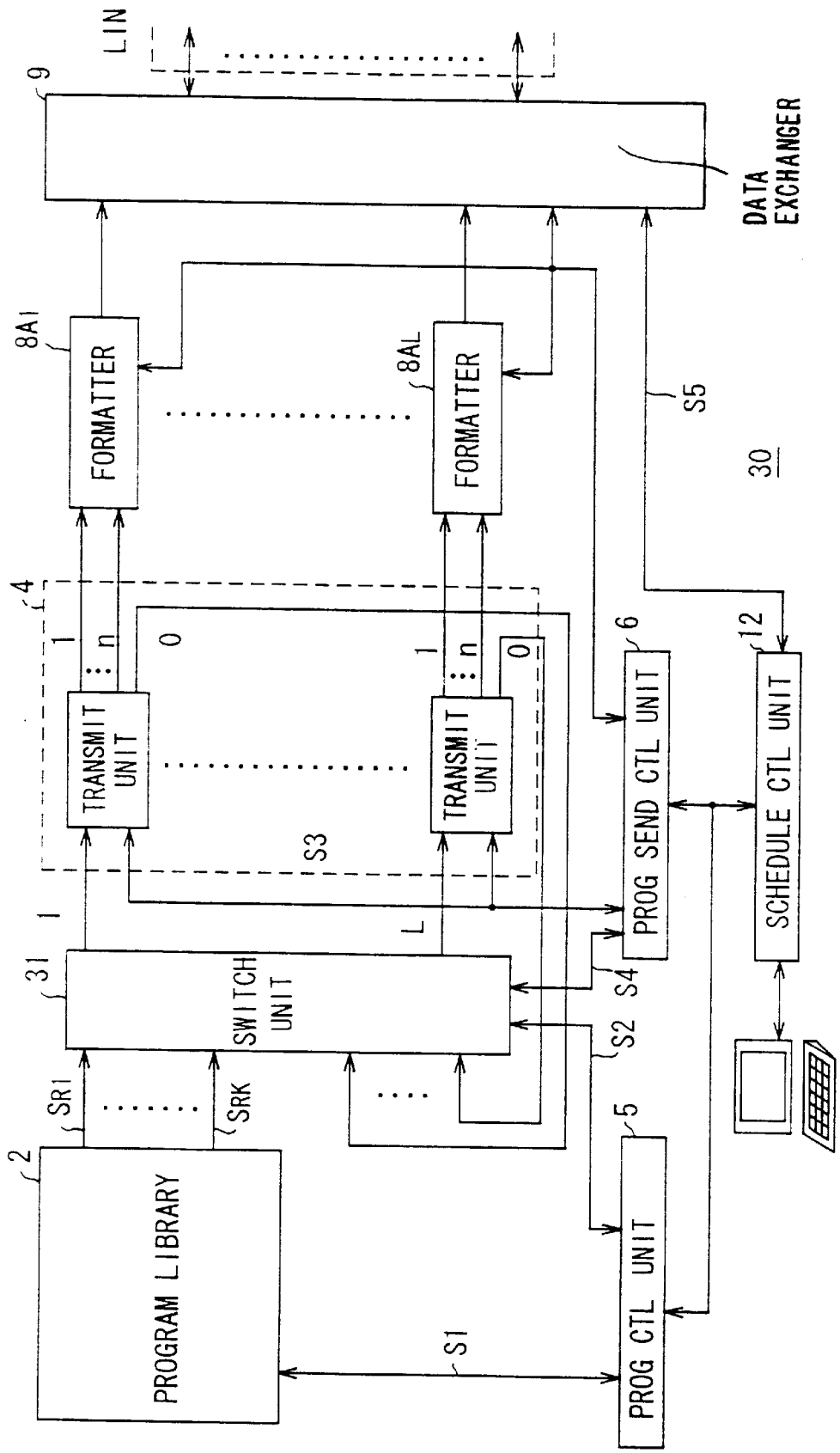
FIG. 9 is a block diagram showing another embodiment of the image data transmission apparatus according to this invention.

Incidentally, in the embodiment described above, a plurality of data transmitting units $4A_1$ to $4A_L$ and $10A_1$ to $10A_m$ are divided into the first group of the data transmitting units 4 and the second group of the data transmitting units 10 so that, when receiving requests are made in the number exceeding the number of output channels to the data transmitting units $4A_1$ to $4A_L$ and $10A_1$ to $10A_m$ of the first group of the data transmitting units 4 or the second group of the data transmitting units 10, empty data transmitting units $10A_1$ to $10A_{m-1}$ or $10A_m$ in the second group of the data transmitting units 10 is concatenatedly connected to the succeeding stage via the switching unit 7 to increase the number of receivers that can receive program information. However, this invention is not only limited to this, but, as shown in FIG. 9, the data transmitting group is constituted with one group of the data transmitting units 4 so that the program library 2 is connected to the data transmitting units $4A_1$ to $4A_L$ via a switching unit 31 according to the empty state of the transmitting units $4A_1$ to $4A_L$, and one of the data transmitting units $4A_1$ to $4A_L$ is concatenatedly connected to another data transmitting units $4A_1$ to $4A_L$. In such a case, $\{(K+L) \times L\}$ matrix switching unit may be used as the switching unit 31.

Furthermore, in the embodiments described above, the disc recording and reproducing device is used in which the magneto-optical disc is used as a recording medium of the data transmitting units $4A_1$ to $4A_L$ and $10A_1$ to $10A_m$, and can record the program information on the magneto-optical disc as the recording and reproducing unit 23 and, at the same time, the program information can be reproduced at a high speed. However, this invention is not only limited to this, but, as the recording medium of the data transmitting units $4A_1$ to $4A_L$ and $10A_1$ to $10A_m$, a magnetic tape, a semiconductor memory, or a disc array can be used, and for the recording and reproducing unit 23, a video tape recorder, a memory controller, or a disc reproduction device, and the like can be used. In short, various types of recording media and the recording and reproducing unit 23 can be applied which can perform access and reading out of information at a high speed.

Furthermore, in the embodiments described above, a cassette auto changer containing a plurality of video tape recorders is used as the program library 2. However, this invention is not only limited to this, but a disk reproduction device or a tape recorder and the like which have various construction can be used for the program library 2.

Furthermore, in the embodiments described above, the transmission data obtained by the image date transmission apparatus 1 is transmitted to the receivers via the telephone circuit LIN. However, the transmission channel is not only limited to this, but various transmission channel can be used such as a CATV circuit or a satellite communication channel and the like.

Furthermore, in the embodiments described above, the program information is provided to all receivers from the beginning by reading out record data from the position corresponding to the requested time of the receiver for each of the time slots allotted to each receiver. However, this invention is not only limited to this, but, when receivers make a request for watching program information in the middle, the program information can be provided from a position desired by each receiver by selecting the reading location in accordance with the request.

Furthermore, in the embodiments described above, this invention is applied to the image data transmission apparatus 1 for transmitting program information from the program library 2. However, data transmitted from the data transmitting units $4A_1$ to $4A_L$ and $10A_1$ to $10A_m$ is not only limited to the program information, but, when data which is other than the program information is transmitted via the data transmitting units $4A_1$ to $4A_L$ and $10A_1$ to $10A_m$, the same efficiency described in the above embodiments can be obtained.

(1-7) Advantage of the embodiments

As described above, according to this invention, the data transmitting units is provided which has recording and reproducing means for recording data on a predetermined recording medium and reproducing data from that recording medium, and distributes the requests of a plurality of receivers to each of the time slots out of a plurality of time slots when reading out the recorded data on the recording medium in accordance with the requests of the receivers, and reads out the recorded data from different recorded areas on the recording medium for each time slot, so that the image data transmission apparatus can be realized which can provide the program information corresponding to the request from a plurality of receivers with a relatively simple construction.

Furthermore, according to this invention, a plurality of data transmitting units are provided and when requests are made in a number exceeding a number of output channels of the first data transmitting units, at least one of the output channels of the first data transmission channel is connected to the input end of the second data transmitting unit to send data from the first and the second data transmitting units, so that the image data transmission apparatus which can provide the transmission data to many receivers with a simple construction.

(2) Data Transmitting Unit (2-1) First embodiment

The following is the description about construction of each of the data transmitting units $4A_1$ to $4A_L$, $10A_1$ to $10A_m$. Incidentally, to simplify the reference numerals, each of the data transmitting units $4A_1$ to $4A_L$, $10A_1$ to $10A_m$ are referred as the data transmitting unit 100 in the following description.

Figure 10:
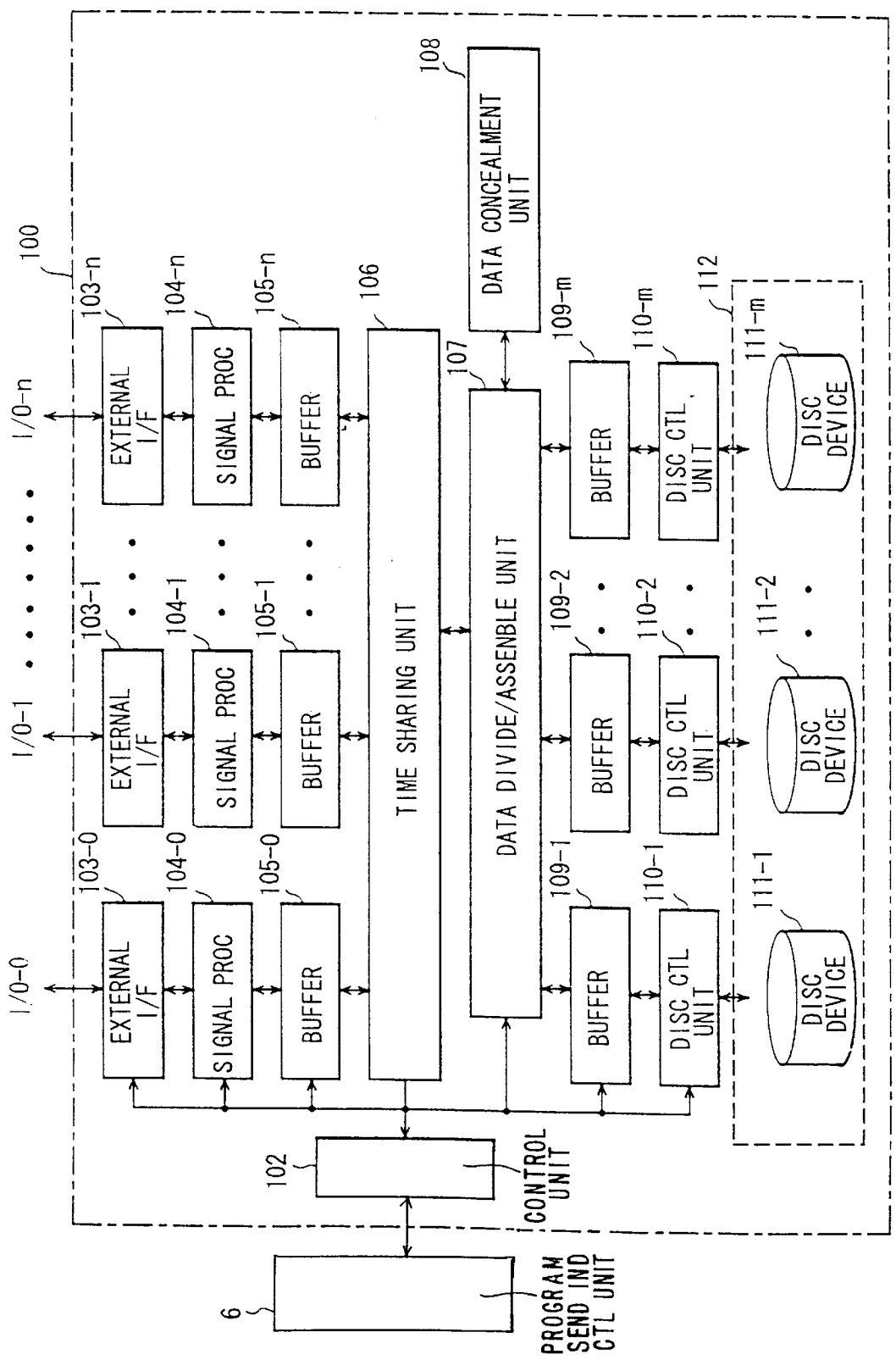
FIG. 10 is a block diagram showing the first embodiment of the transmitting unit of the image data transmission apparatus shown in FIG. 1.

A block diagram of an image transmission apparatus of this invention is shown in FIG. 10.

In the data transmitting unit 100 shown in FIG. 10, reference numerals 103-0, 103-1, . . . 103-n are external interface (I/F) units for performing input/output interface processing of digital image data between external devices, namely the switching units 3 and 7 and the formatter $8A_1$ to $8A_L$, and $11A_1$ to $11A_m$; 104-0, 104-1, . . . 104-n are signal processing units for converting the format of input digital image data into a format which can be handled by the data transmitting unit 100; 105-0, 105-1, . . . 105-n are buffers for temporarily storing the image data from the signal processing units 104-0, 104-1, . . . 104-n; 106 is a time sharing unit for performing time division for the image data from the buffers 105-0, 105-1, . . . 105-n; 107 is a data dividing/assembling unit for dividing the image data into each unit at the recording operation and assembling the image data for each unit read at the reading operation for a series of image data; and 108 is a data concealment unit for concealing image data in which an error has occurred at assembling the image data.

Further, 109-1, 109-2, . . . 109-n are buffers for temporarily storing the image data divided into each unit and temporarily storing the image data which has been read out for each unit; 110-1, 110-2, . . . 110-m are disc control units for controlling the writing/reading of disc devices 111-1, 111-2, . . . 111-m; and 111-1, 111-2, . . . 111-m are the disc devices composed of magnetic discs or magneto-optical discs, which comprises a disc array device 112. In addition, 102 is connected to the program sending control unit 6 to control the above respective units. Further, the disc control units 110-1, 110-2, . . . 110-m and the disc devices 111-1, 111-2, . . . 111-m are connected by Small Computer System Interface (SCSI).

In the image transmission apparatus constructed like this, the digital image data of a plurality of series, which is input via I/O channels I/O-0, I/O-1, . . . I/O-n is processed the data input/output interface processing in the external I/F units 103-0, 103-1, . . . 103-n, and is converted format at the signal processing units 104-0, 104-1, . . . 104-n. The format of the digital image data input via I/O channels I/O-0, I/O-1, ... I/O-n is, for instance, Serial Digital Interface (SDI), and this format is converted into parallel digital image data and supplied to buffers 105-0, 105-1, ... 105-n. The digital image data stored in buffers 105-0, 105-1, ... 105-n is processed access queuing processing at the time sharing unit 106, and is read out when coming the turn of accessing to be supplied to the data dividing/assembling unit 107.

This enables the simultaneous processing of the plurality of digital image data which is input through I/O channels I/O-1, I/O-2, ... I/O-m.

In the data dividing/assembling unit 107, the digital data is divided, for instance, for each line, and the image data divided into each line is sequentially stored in buffers 109-1, 109-2, ... 109-m. Further, the image data divided into each line is written into the disc devices 111-1, 111-2, ... 111-m by the disc control units 110-1, 110-2, ... 110-m. That is, the image data of the first line is written into the disc device 111-1, the image data of the second line is written into the disc device 111-2, the image data of the third line is written into the disc device 111-3, the subsequent image data is sequentially written in a similar manner, the image data of the m-th line, and the next block (m+1) returns to the beginning and is written into the disc device 111-1. In this way, the digital image data input through I/O channels I/O-0, I/O-1, ... I/O-n is distributed to store in the disc array device 112 consisting of the plurality of disc devices 111-1, 111-2, ... 111-m. Incidentally, I/O-0 of I/O channels is connected to the input of the switching unit 7. And each output signals of the switching units 3 and 7 are input into the data transmitting unit 100 via I/O channels I/O-0, I/O-1, ... I/O-n.

Further, the image data divided into each line is reproduced from respective disc devices 111-1, 111-2, ... 111-m under the control of the disc control units 110-1, 110-2, ... 110-n, and stored in the buffers 109-1, 109-2, ... 109-m. The image data for each line stored in the buffers 109-1, 109-2, ... 109-m is supplied to the data dividing/assembling unit 107 to be assembled to the original series of image data and restored. The restored digital image data is stored in buffers 105-0, 105-1, ... 105-n by the time sharing unit 106, and the digital image data stored in buffers 105-0, 105-1, ... 105-n is converted to the original format, for instance, SDI, by the signal processing units 104-0, 104-1, ... 104-m and transmitted to the external devices from the external I/F units 103-0, 103-1, ... 103-n through I/O channels I/O-0, I/O-1, I/O-n.

The following is the description for the case in which data cannot be read and error data occurs because of occurrence of failure in any of disc devices 111-1, 111-2, ... 111-m. However, for simplicity, the description is made on the assumption that there are four disc devices and the faulty disc is the disc device 111-3, the third disc.

When a failure occurs in the disc device 111-3, error data is generated in the (4L+3)-th line (L=0, 1, 2, ...) and this data must be concealed. The data concealment unit 108 then captures the data of (4L+2)-th line stored in buffer 109-2 and the data of (4L+4)-th line stored in buffer 109-4 to conceal lost data of (4L+3)-th line in utilizing line correlation, and thereafter passes the result of concealment to the data dividing/assembling unit 107. In the data dividing/assembling unit 107, the normal image data for each line and the concealed image data are then used to process re-assemble processing of a series of image data. The restored image data is distributed through the time sharing unit 106 to, for instance, a system composed of buffer 105-1, the signal processing unit 104-1, and the external I/F unit 103-2, and the digital image data is transmitted to the external device by I/O channel I/O-1. For the method of this concealment, it is used that the average value of the pixel data of (4L+2)-th line and the pixel data of (4L+4)-th line is allotted for the pixel data of (4L+3)-th line.

The I/O channel to which the image data is transmitted is not only limited to I/O-1, but any I/O channel can be available.

Furthermore, in the data transmitting unit 100 described above, the digital image data is divided for each one line. However, this invention is not only limited to this, but the digital image data can be divided for each one frame, each one field, or each block which is possible to correlate with each other. If the image data is divided such a manner, lost image data can be concealed when any fault occurs in any disc devices 111-1, 111-2, ... 111-m because divided image data is correlative.

Incidentally, the fault of the disc devices 111-1, 111-2, ... 111-m is detected by the disc control devices 110-1, 110-2, ... 110-m and, when the failure is detected, the data concealment unit 108 is caused to perform the above operation for concealing lost data under the control of the control unit 102. Further, the presence of the fault in reproduced image data may be detected directly.

As described above, in the first embodiment of the data transmitting unit 100 of this invention, a disc array device can be provided which can perform error correction without providing the disc device for storing error correction code, thereby the data transmitting unit 100 can be realized with high reliability and at low cost.

(2-2) Second embodiment

Figure 11:
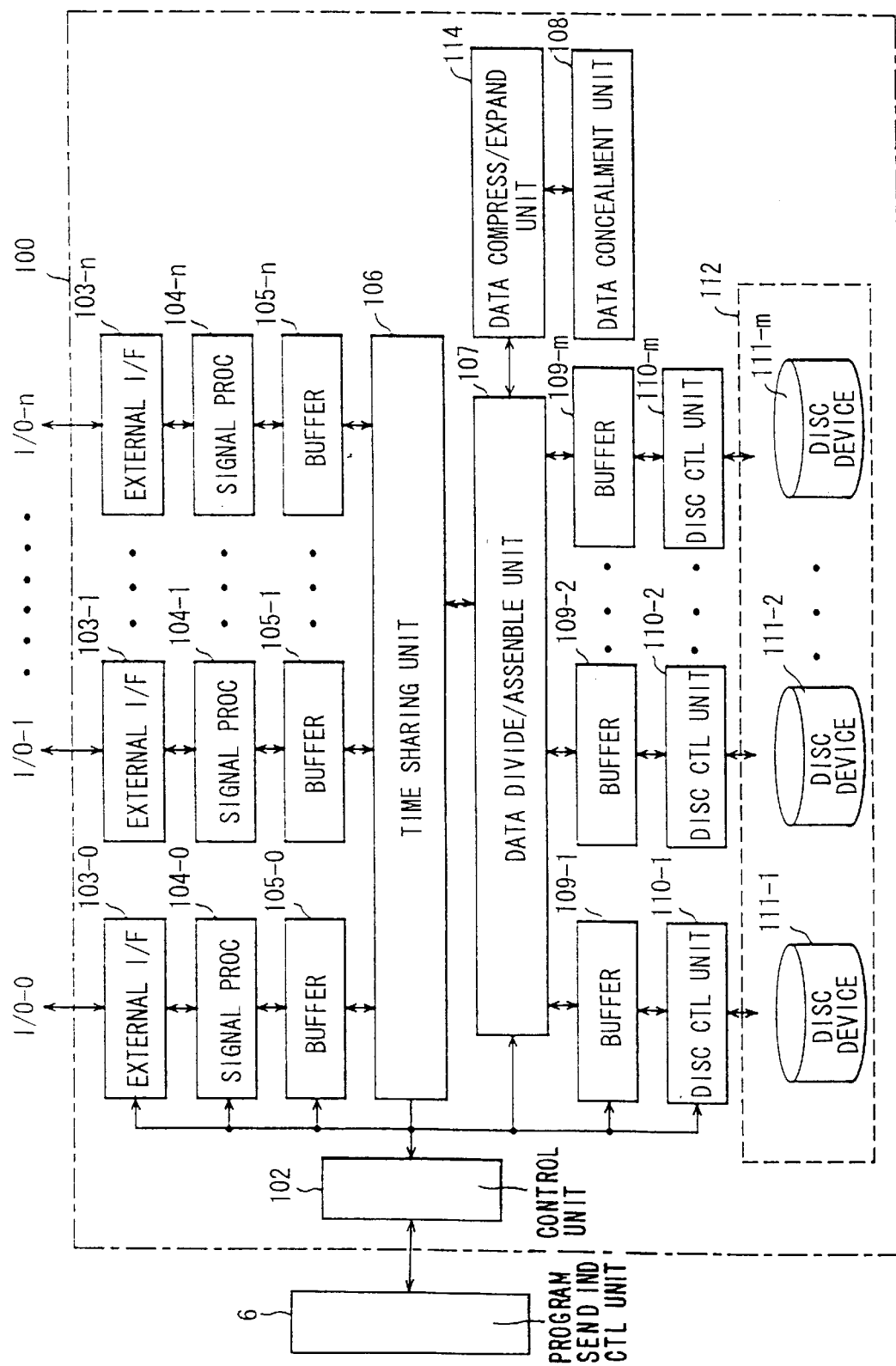
FIG. 11 is a block diagram showing the second embodiment of the transmitting unit of the image data transmission apparatus shown in FIG. 1.

The block diagram of the second embodiment of the data transmitting unit 100 of this invention is shown in FIG. 11. In the second embodiment, it is described about the data transmitting unit 100 in the case where the digital image data input via I/O channels I/O-0 to I/O-n is compressed. Incidentally, same reference numerals are applied to same portions of the data transmitting unit 100 shown in FIG. 10 to omit description about them.

The data transmitting unit 100 of the second embodiment consists that a data compression/expansion unit 114 is added to the data transmitting unit 100 of the first embodiment. The reason why the data compression/expansion unit 114 is added is as follows. When any fault occurs in any of the disc devices 111-1, 111-2, ... 111-m, the data concealment unit 108 captures data from buffer storing the image data which is read out from the disc devices before or behind of the disc device having fault. However, the image data stored in the disc device is compressed and compression is performed by variable-length coding in general, so that concealment can not be executed in the state where data is compressed.

Therefore, the data compression/expansion unit 114 is added to restore compressed image data to original state and to compress concealed image data.

That is, the data compression/expansion unit 114 processes expansion processing to the image data captured into the data concealment unit 108 to restore to original data and supply to the data concealment unit 108, and processes compression processing to the image data concealed at the data concealment unit 108, and then passes it to the data dividing/assembling unit 107.

The following is the description about the data transmitting unit shown in FIG. 11. The compressed digital image data input via I/O channels I/O-0, I/O-1, ... I/O-n is processed data input/output interface processing by the external I/F units 103-0, 103-1, ... 103-n, and is converted its format by the signal processing units 104-0, 104-1, ...

104-n as described above, thereby is supplied to buffers 105-0, 105-1, 105-n as parallel digital image data. The digital image data stored in buffers 105-0, 105-1, . . . 105-n is processed access queuing processing by the time sharing unit 106, and is read out when coming the turn of access to be supplied to the data dividing/assembling unit 107.

In the data dividing/assembly unit 107, the digital data is divided into, for instance, each one block, and the image data divided for each one block is sequentially stored in buffers 109-1, 109-2, . . . 109-m. Further, the image data divided for one block is written into the disc devices 111-1, 111-2, . . . 111-m by the disc control units 110-1, 110-2, . . . 110-m. That is, the image data of the first block is written into the disc device 111-1, the image data of the second block is written into the disc device 111-2, the image data of the third block is written into the disc device 111-3, the subsequent image data is sequentially written in a similar manner, the image data of the n-th block is written into the disc device 111-m, and the next line (n+1) returns to the beginning and is written into the disc device 111-1. In this way, the digital image data input through I/O channels I/O-0, I/O-1, . . . I/O-n is distributed to the disc array device 112 consisting of a plurality of disc devices 111-1, 111-2, . . . 111-m to store.

In this way, the image data divided in the compressed state is stored in each of the disc devices 111-1, 111-2, . . . 111-m.

Then, the image data divided into each one block is reproduced from respective disc devices, 111-1, 111-2, . . . 111-m and stored in buffers 109-1, 109-2, . . . 109-m under the control of the disc control units 110-1, 110-2, . . . 110-m. The image data for each one block stored in buffers 109-1, 109-2, . . . 109-m is supplied to the data dividing/assembling unit 107, and is assembled and restored to the original series status of image data. The restored digital image data is stored in buffers 105-0, 105-1, . . . 105-n by the time sharing unit 106, the compressed digital image data stored in buffers 105-0, 105-1, . . . 105-n is converted into the original format, for instance, SDI, by the signal processing units 104-0, 104-1, . . . 104-n, and then transmitted from the external I/F units 103-0, 103-1, . . . 103-n to the external devices through I/O channels I/O-0, I/O-1, . . . I/O-n.

The following is the description for the case in which data cannot be read and error data is generated because of occurrence of failure in any of disc devices 111-1, 111-2, . . . 111-m. However, for simplicity, the description is made on the assumption that there are four disc devices and the faulty disc is the disc device 111-3, the third disc.

When a failure occurs in the disc device 111-3, error data is generated in the (4L+3)-th block (L=0, 1, 2, . . . ) and this data must be concealed. The data concealment unit 108 then expands the data of (4L+2)-th block stored in buffer 109-2 and the data of (4L+4)-th block stored in buffer 109-4 to restore the data before being compressed, and then conceal the lost data of (4L+3)-th block in utilizing the correlation between blocks. Thereafter, the data is processed compression processing at the data compression/expansion unit 104 and passed to the data dividing/assembling unit 107 as a compressed data. In the data dividing/assembling unit 107, the normal image data for each block which is compressed and the concealed image data are then used to process re-assembling processing of a series of compressed image data.

The restored compressed image data is distributed through the time sharing unit 106 to, for instance, the system composed of buffer 105-1, the signal processing unit 104-1, and the external I/F unit 103-1, and the compressed digital image data is transmitted from I/O channel I/O-1 to the external device.

The I/O channel to which the image data is transmitted is not only limited to I/O-1, but any I/O channel can be available.

Furthermore, in the data transmitting unit 100 described above, the digital image data is divided for each one block: It is assumed that this blocks are correlative for the image data between each block. Furthermore, if flag designating, for instance, frame is added to the compressed image data, the image data can be divided for each frame by decoding flag. Moreover, if flag is added for each field or smaller unit, the image data can be divide for each field or smaller unit.

Incidentally, the fault of the disc devices 111-1, 111-2, . . . 111-m is detected by the disc control devices 110-1, 110-2, . . . 110-m and, when the failure is detected, the data concealment unit 108 is caused to perform the above operation for concealing lost data under the control of the control unit 102.

As described above, in the second embodiment of the data transmitting unit 100 of this invention, error correction can be performed and compressed digital image data can be handled. Thereby, the data transmitting unit 100 can be realized with high reliability and at low cost.

Since the data transmitting unit 100 of this invention is constructed as described above, it can handle the digital image data and, when an error occurs, lost image data can be concealed from the data unit before or behind of the data unit which error has occurred in utilizing that the image data is very correlative. Therefore, it costs lower than ever.

In addition, since compressed image data can be handled, the amount of image data which can be stored in the data transmitting unit 100 can be significantly increased.

(2-3) Third embodiment

Next, the third embodiment of the data transmitting unit 100 of this invention will be described with reference to FIG. 12. Incidentally, same reference numerals are applied to same portions of the data transmitting unit 100 shown in FIGS. 10 or 11 to omit description about them.

Figure 12:
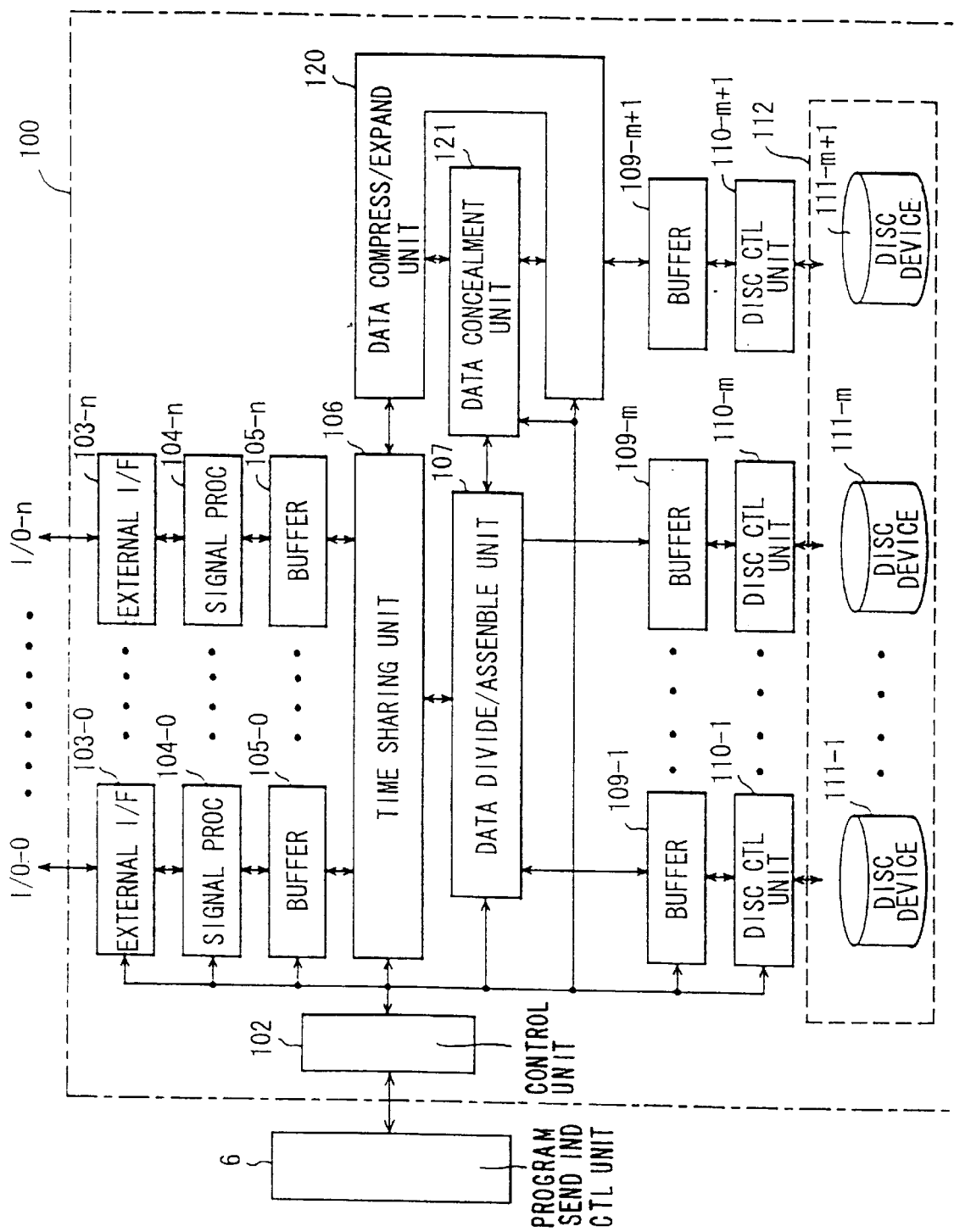
FIG. 12 is a block diagram showing the third embodiment of the transmitting unit of the image data transmission apparatus shown in FIG. 1.

In FIG. 12, 120 is a data compression/expansion unit for highly compressing all image data to be input and expanding highly compressed image data to restore in a state before being compressed, and 121 is a data concealment unit for concealing the image data in which an error has occurred at assembling the image data.

In addition, 111-m+1 is a disc device for high compression, to which the input image data highly compressed by the data compression/expansion unit 120 and temporarily stored in a buffer 109-m+1 is written under the control of a disc control unit 110-m+1. Incidentally, 112 is a disc array device consisting of the plurality of disc devices 111-1, 111-2, . . . 111-m, 111-m+1.

Furthermore, the input digital image data being processed by the time sharing unit 106 is all supplied to the data compression/expansion unit 120 and highly compressed to 1/n, and temporarily stored in the buffer 109-m+1. Assuming that "m" is the number of the disc devices 111-1, 111-2, . . . 111-m. The highly compressed image data temporarily stored in buffer 109-m+1 is written to the disc device 111-m+1 by the disc control unit 110-m+1.

In the data dividing/assembling 107, the digital image data is divided into each predetermined block, and divided image data for each block is sequentially stored in buffers 109-1, 109-2, . . . 109-m. Further, through the disc control units 110-1, 110-2, . . . 110-m, the image data divided for each one block is distributed and written into the disc devices 111-1, 111-m, . . . 111-m+1. That is, the image data of the first block is written into the disc device 111-1, the image data of the second block is written into the disc device 111-2, the image data of the third block is written into the disc device 111-3, the subsequent image data is sequentially written in a similar manner, the image data of the n-th line is written into the disc device 111-m, and the image data of next (n+1)-th line returns to the beginning and is written into the disc device 111-1. In this way, the digital image data input through I/O channels I/O-0, I/O-1, . . . I/O-n is distributed to and stored in the disc array device 112 consisting of a plurality of disc devices 111-1, 111-2, . . . 111-m.

In addition, all of the input digital image data is supplied to the data compression/expansion unit 120 to be highly compressed to 1/n and stored in the disc device 111-m+1.

When the image data is read out from the external devices through I/O channels I/O-0, I/O-1, . . . I/O-n, the image data divided for each one block by the disc control units 111-1, 111-2, . . . 111-m is reproduced from each disc devices, 111-1, 111-2, . . . 111-m and stored in buffers 109-1, 109-2, . . . 109-m. The image data for each block stored in buffers 109-1, 109-2, . . . 109-m is supplied to the data dividing/assembling unit 107, and assembled to the original series status of image data to restore. The restored digital image data is stored in buffers 105-0, 105-1, . . . 105-n by the time sharing unit 106, the digital image data stored in buffers 105-0, 105-1, . . . 105-n is converted into the original format, for instance, SDI, by the signal processing units 104-0, 104-1, . . . 104-n, and a series of image data is transmitted to the external devices through I/O channels I/O-0, I/O-1 . . .. I/O-n.

The following is the description in the case where data cannot be read and error data occurs when a failure occurs in any of disc devices 111-1, 111-2, . . . 111-m. The description is made on the assumption that the faulty disc is the disc device 111-3, which is the third disc.

If a failure occurs in the disc device 111-3, error data is generated in the (mL+3)-th block (L=0, 1, 2, . . . ) and this data must be concealed. The control unit 102 then expands the image data read from the disc device for high compression 111-m+1 which is stored in buffer 109-m+1 by the data compression/expansion unit 120 to decode it to the original image data status before being compressed, and passes it to the data concealment unit 121. The data concealment unit 121 uses the expanded image data for concealment, and provides the result to the data dividing/assembling unit 107. In the data dividing/assembling unit 107, the normal image data for each block and the concealed image data are then used to assemble a series of image data, and is processed restoration processing. The restored image data is distributed through the time sharing unit 106 to, for instance, a system composed of buffer 105-1, the signal processing unit 104-1, and the external I/F unit 103-1, and the digital image data is transmitted by I/O channel I/O-1. This concealment is accomplished by, for instance, reproducing the lost data of (mL+3)-th block from the disc device for highly compression 111-m+1 and replacing by the expanded data of (mL+3)-th block at the data compression/expansion unit 120.

In addition, in the disc device for high compression 111-m+1, all of the image data stored in the disc devices 111-1, 111-2, . . . 111-m is highly compressed and stored and thus, even if failure occurs to the plurality of disc devices 111-1, 111-2, . . . 111-m, concealment can be performed by the concealment unit 121.

Moreover, the I/O channel to which the image data is transmitted is not only limited to I/O-2, but any I/O channel can be available.

Incidentally, the failure of the disc devices 111-1, 111-2, . . . 111-m is detected by the disc control units 110-1, 110-2, . . . 110-m and, when the failure is detected, the data concealment unit 121 is caused to perform the above operation for concealing the lost data under the control of the control unit 102.

Thus, in the third embodiment of the data transmitting unit 100 of this invention, by reading the image data lost by an error when the error occurs from the disc device for high compression 111-m+1 and expanding it, the image data can be concealed, so that easy concealment can be performed even if the failure occurs to more than one disc device.

The following is the description in the case where the image data to be input is compressed. However, in this case, the operation of the data compression/expansion unit 120 is only slightly different and, thus, the description is made with reference to FIG. 12.

If the digital image data to be input and output through the I/O channels I/O-0 to I/O-n is previously compressed, the image data is written into the plurality of disc devices 111-1, 111-2, . . . 111-m in the disc array device 112 by an operation similar to the above. However, in this case, the image data to be written is that image data which is still compressed.

That is, the digital image data input through I/O channels I/O-0, I/O-1, . . . I/O-n is processed data input/output interface processing by the external I/F units 103-1, 103-2, . . . 103-n and the format conversion described above by the signal processing units 104-0, 104-1, . . . 104-n, whereby it is changed to parallel digital image data, which is supplied to buffers 105-0, 105-1, . . . 105-n. The digital image data stored in buffers 105-0, 105-1, . . . 105-n is subjected sequentially to an access queuing processing by the time sharing unit 106 and, at its access, is read and supplied to the data dividing/assembling unit 107.

In the data dividing/assembling unit 107, the digital data is divided, for instance, for each one block, and the image data divided into each block is sequentially stored in buffers 109-1, 109-2, . . . 109-m. Further, the image data divided into each one block is written to the disc devices 111-1, 111-2, . . . 111-m by the disk control units 110-1, 110-2, . . . 110-m. That is, the image data of the first block is written into the disc device 111-1, the image data of the second block is written into the disc device 111-2, the image data of the third block is written into the disc device 111-3, the subsequent image data is sequentially written in a similar manner, and the image data of next (n+1)-th block returns to the beginning and is written to the disc device 111-1. In this way, the digital image data input through I/O channels I/O-0, I/O-1, . . . I/O-n is distributed and written to the disc array device 112 consisting of the plurality of disc devices 111-1, 111-2, . . . 111-m.

Further, the compressed input digital image data being processed by the time sharing unit 106 is all supplied to the data compressing/expansion unit 120, and further the amount of data is highly compressed to 1/n and temporarily stored in buffer 109-m+1. The highly compressed image data temporarily stored in buffer 109-m+1 is written into the disc device for high compression 111-m+1 by the disc control unit 111-m+1.

Further, when the image data is read from the external devices through I/O channels I/O-0, I/O-1, . . . I/O-n, the image data divided into each one block is reproduced from respective disc devices 111-1, 111-2, . . . 111-m by the disc control units 110-1, 110-2, . . . 110-m and stored in buffers 109-1, 109-2, . . . 109-m. The image data for each one block stored in buffers 109-1, 109-2, . . . 109-m is supplied to the data dividing/assembling unit 107 to be assembled and restored to the original series of compressed image data. The restored digital image data is stored in buffers 105-0, 105-1, . . . 105-n by the time sharing unit 106, and the compressed digital image data stored in buffers 105-0, 105-1, . . . 105-n is converted into the original format, for instance, SDI, by the signal processing units 104-0, 104-1, . . . 104-n and then transmitted to the external devices by the external I/F means 103-0, 103-1, . . . 103-n through I/O channels I/O-0, I/O-1, . . . I/O-n.

The following is the description in the case where data cannot be read and error data occurs when a failure occurs in any of disc devices 111-1, 111-2, . . . 111-m. The description is made on the assumption that the faulty disc is the disc device 111-3, which is the third disc, same as the above description.

If a failure occurs in the disc device 111-3, error data occurs in the (nL+3)-th block (L=0, 1, 2, . . . ) and this data must be concealed. The control unit 102 then expands the image data which is read from the disc device 111-m+1 for high compression and stored in buffer 111-m+1 with the data compression/expansion unit 120 to restore it to the original image data status before it was compressed, and passes it to the data concealment unit 121. The data concealment unit 121 uses the expanded image data for concealment, further provides the result to the data compression/expansion unit 120 for compression, and thereafter passes it to the data dividing/assembling unit 107. In the data dividing/assembling unit 107, the normal image data for each block and the concealed image data are then used to assemble a series of image data and perform restoration processing. The restored compressed image data is distributed through the time sharing unit 106 to, for instance, a system composed of buffer 105-1, the signal processing unit 104-1, and the external I/F unit 103-n, and compressed digital image data is transmitted to the external device by the I/O channel I/O-1.

The I/O channel to which the image data is transmitted is not only limited to I/O-1, but any I/O channel can be made available.

Incidentally, the failure of the disc devices 111-1, 111-2, . . . 111-m is detected by the disc control devices 110-1, 110-2, . . . 110-m and, when the failure is detected, the data concealment unit 121 is to perform the above operation for concealing the lost data under the control of the control unit 102.

As described above, in this invention, by making only a slight change to the data compression/expansion unit 120, the image transmission apparatus can be provided which includes the disc array device and can handle compressed digital image data. Further, the image transmission apparatus with high reliability can be realized which includes a mass storage disc array device and can handle compressed digital image data.

(2-4) Advantage of the embodiments

Since the image transmission apparatus of this invention is constructed as described above, it can handle the digital image data, and when the error occurs, the image data lost by an error is read out from the disc device for high compression and is expanded, thereby can be concealed, so that easy concealment can be provided even if more than one disc device fails to operate correctly.

In addition, since the image transmission apparatus of this invention can handle compressed image data, the amount of image data which can be stored in the data transmitting unit 100 can be significantly increased.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data transmission apparatus for transmitting image data signal to a plurality of end devices in response to requests from each of said plurality of end devices, said plurality of end devices having a number of time slots assignable thereto, comprising:

dividing means for dividing input image data signal into a plurality of unit image data;

first plural storing means each having a recording medium for storing said plurality of unit image data divided by said dividing means on said recording medium in each of said first plural storing means;

second plural storing means each having a recording medium for storing said plurality of unit image data on said recording medium in each of said second plural storing means when the number of said end devices requesting said image data signal exceeds a predetermined number, said predetermined number being determined as a function of the number of time slots assigned to said plurality of end devices;

reproducing means for reproducing unit image data on a time division basis from said first plural storing means and/or said second plural storing means as a function of the number of said end devices requesting said image data signal, such that the reproducing means reproduces said unit image data from said first and said second plural storing means if the number of said end devices requesting said image data signal exceeds said predetermined number;

combining means for combining and forming said image data signal from the reproduced unit image data for each of said end devices requesting said image data signal; and transmitting means for transmitting the formed image data signal supplied from said combining means to corresponding end devices requesting said image data signal.

2. The image data transmission apparatus according to claim 1, wherein said first and second plural storing means are disc devices.

3. The image data transmission apparatus according to claim 1, further comprising:

detection means for detecting the presence of failures in any one of said first and second plural storing means; and data concealment means for generating unit image data to be reproduced from a failed storing means by interpolation using unit image data reproduced from the other storing means, and supplying said interpolated unit image data to said combining means.

4. The image data transmission apparatus according to claim 1, further comprising:

data compression means for reducing the amount of data of said input image data signal; and another storing means for storing image data compressed by said data compression means.

5. The image data transmission apparatus according to claim 4, further comprising:

detection means for detecting the presence of failures in any one of said first and second plural storing means; and means for operating the reproducing means to reproduce from said another storing means unit image data to be reproduced from the failed storing means and supplying said unit image data reproduced from said another storing means to said combining means.

6. The image data transmission apparatus according to claim 1, wherein said unit image data is one line data of the image data signal.

7. The image data transmission apparatus according to claim 1, wherein said unit image data is one frame data of the image data signal.

8. The image data transmission apparatus according to claim 1, wherein said unit image data is one field data of the image data signal.

9. A data transmission apparatus for transmitting image data signal to a plurality of end devices in response to requests from said plurality of end devices, said plurality of end devices having a number of time slots assignable thereto, comprising:

program library with a plurality of pre-stored image data;

a plurality of image signal transmitting units, each of said plurality of image signal transmitting units comprising dividing means for dividing input image data signal into a plurality of unit image data;

first plural storing means each having a recording medium for storing said plurality of unit image data divided by said dividing means on the recording medium in each of said first plural storing means;

second plural storing means each having a recording medium for storing said plurality of unit image data on said recording medium in each of said second plural storing means when the number of said end devices requesting said image data signal exceeds a predetermined number, said predetermined number being determined as a function of the number of time slots assigned to said plurality of end devices;

reproducing means for reproducing unit image data on a time division basis from said first plural storing means and/or said second plural storing means as a function of the number of said end devices requesting said image data signal, such that the reproducing means reproduces said unit image data from said first and said second plural storing means if the number of said end devices requesting said image data signal exceeds said predetermined number; and combining means for combining and forming said image data signal from the reproduced unit image data for each of said end devices requesting said image data signal;

transmitting means for transmitting the formed image data signal supplied from said plurality of image signal transmitting units to corresponding end devices requesting said image data signal; and switching means for selectively supplying from said program library said plurality of pre-stored image data to said plurality of image signal transmitting units as said input image data signal.

10. The image data transmission apparatus according to claim 9, further comprising second switching means for selectively connecting each of said image signal transmitting units to each other and by diverting said requests made to an overloaded image signal transmitting unit to another image signal transmitting unit, wherein said second switching means selectively supplies the image data signal output from said overloaded image signal transmitting unit to said another image signal transmitting unit as said input image data signal.

11. A data transmission apparatus for transmitting image data signal to a plurality of end devices in response to requests from said plurality of end devices, said plurality of end devices having a number of time slots assignable thereto, comprising:

program library with a plurality of pre-stored image data;

a plurality of image signal transmitting units, each of said plurality of image signal transmitting units comprising dividing means for dividing input image data signal into a plurality of unit image data;

first plural storing means each having a recording medium for storing said plurality of unit image data divided by said dividing means on the recording medium in each of said first plural storing means;

second plural storing means each having a recording medium for storing said plurality of unit image data on said recording medium in each of said second plural storing means when the number of said end devices requesting said image data signal exceeds a predetermined number, said predetermined number being determined as a function of the number of time slots assigned to said plurality of end devices;

reproducing means for reproducing unit image data on a time division basis from said first plural storing means and/or said second plural storing means as a function of the number of said end devices requesting said image data signal, such that the reproducing means reproduces said unit image data from said first and said second plural storing means if the number of said end devices requesting said image data signal exceeds said predetermined number; and combining means for combining and forming said image data signal from the reproduced unit image data for each of said end devices requesting said image data signal;

transmitting means for transmitting the formed image data signal supplied from said plurality of image signal transmitting units to corresponding end devices requesting said image data signal; and switching means for selectively supplying from said program library said plurality of pre-stored image data to said plurality of image signal transmitting units as said input image data signal and for selectively connecting each of said image signal transmitting units to each other and diverting said requests made to an overloaded image signal transmitting unit to another image signal transmitting unit, wherein said second switching means selectively supplies image data signal output from said overloaded image signal transmitting unit to said other image signal transmitting unit as said input image data signal.

12. A data transmission apparatus for transmitting image data signal to a plurality of end devices in response to requests from said plurality of end devices, said plurality of end devices having a number of time slots assignable thereto, comprising:

first storing means for storing said image data on a first recording medium;

second storing means for storing said image data on a second recording medium when the number of end devices requesting said image data exceeds a predetermined number, said predetermined number being determined as a function of the number of time slots assigned to said plurality of end devices;

reproducing means for reproducing said image data from said first recording medium and/or said second recording medium as a function of the number of said end devices requesting said image data, such that the reproducing means reproduces said image data from said first and said second recording media if the number of said end devices requesting said image data exceeds the predetermined number; and transmitting means for transmitting said reproduced image data to each of said end devices requesting the image data.

13. Method of transmitting image data signal to a plurality of end devices in response to requests from said plurality of end devices, comprising the steps of:

storing said image data on a first recording medium;

storing said image data on a second recording medium when the number of end devices requesting said image data exceeds a predetermined number, wherein said predetermined number is determined as a function of number of time slots assignable to said plurality of end devices;

reproducing said image data from said first recording medium and/or said second recording medium as a function of the number of said end devices requesting said image data, such that the reproducing means reproduces said image data from said first and said second recording media if the number of said end devices requesting said image data exceeds the predetermined number; and transmitting said reproduced image data to each of said end devices requesting the image data.

* * * * *